No. 885,047. PATENTED APR. 21, 1908.
W. A. HENDRYX.
FILTERING APPARATUS.
APPLICATION FILED AUG. 9, 1906.
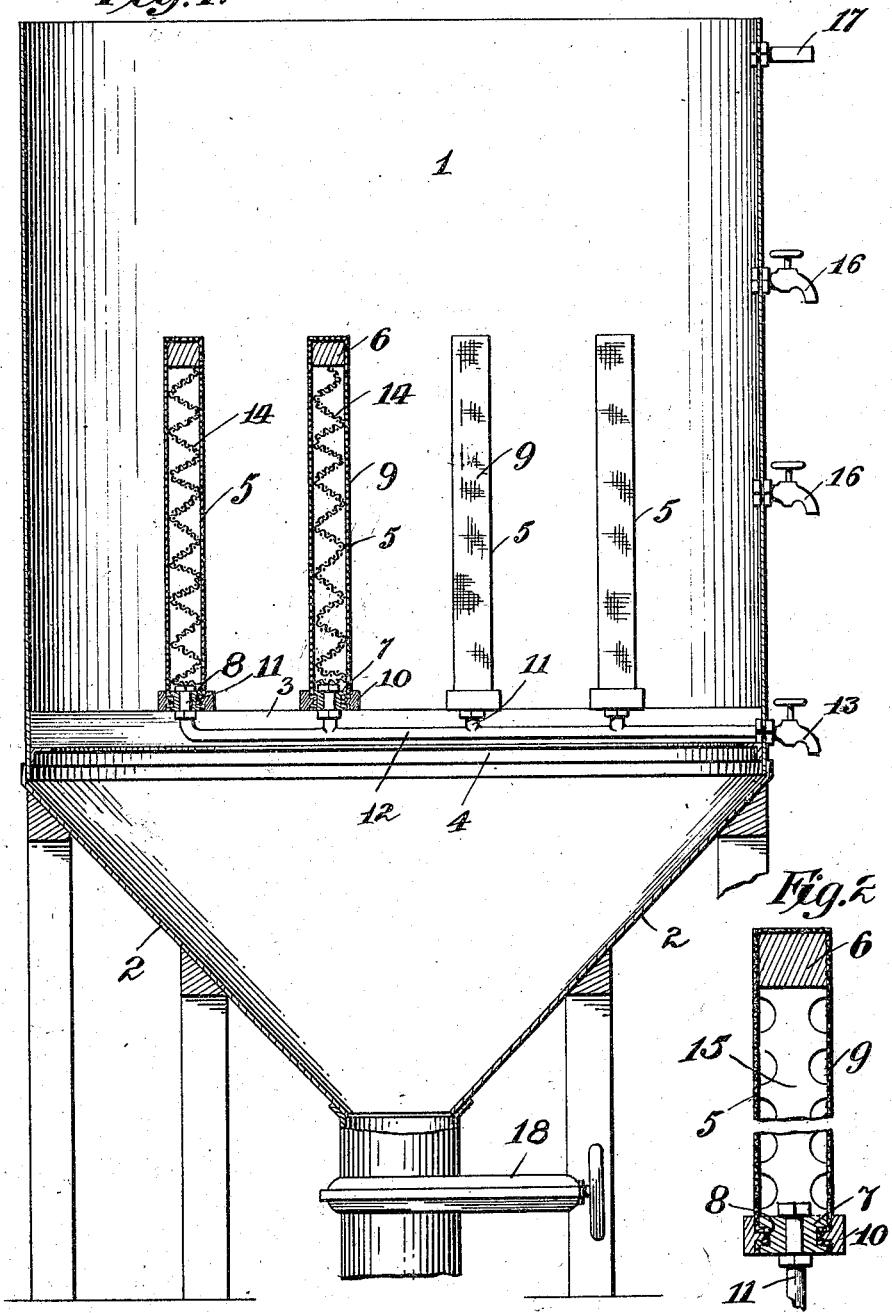
Attest:
Inventor:
Wilbur A. Hendryx,
by Byrnes & Townsend
Attys.

UNITED STATES PATENT OFFICE.

WILBUR ALSON HENDRYX, OF DENVER, COLORADO, ASSIGNOR OF ONE-HALF TO CHARLES BUTTERS, OF BERKELEY AND SAN FRANCISCO, CALIFORNIA.

FILTERING APPARATUS.

No. 885,047.　　　　　Specification of Letters Patent.　　　Patented April 21, 1908.

Application filed August 9, 1906. Serial No. 329,811.

*To all whom it may concern:*

Be it known that I, WILBUR ALSON HENDRYX, a citizen of the United States, residing at Denver, in the county of Denver and State of Colorado, have invented certain new and useful Improvements in Filtering Apparatus, of which the following is a specification.

The object of this invention is to provide a filter cell adapted for the treatment of mixtures of ore and solvent liquor, such as orepulp, for the separation therefrom of a clear metal-bearing solution in an expeditious manner.

The filter cell comprises essentially an open frame, a filtering medium thereon, and a non-metallic pervious filling adapted to support said filtering medium while providing a free passage for filtered liquid. In use the cell is mounted in a suitable tank of any desired form, outlets from the cell or cells extending to the exterior of the tank.

For a full understanding of the invention reference is made to the accompanying drawing, wherein Figure 1 is a central vertical section showing a plurality of cells in position in a tank, and Fig. 2 is a central vertical section on a somewhat larger scale of a modified form of cell.

Referring to the figures, 1 represents a tank which may be of any suitable shape or dimensions, having a converging bottom 2, illustrated as conical. Within the tank and preferably just above the bottom 2 are arranged transverse timbers 3, carried by an angle iron 4 or otherwise held, and serving to support a plurality of filters or filter cells 5 shown as four in number. It will be understood that the number of cells in each tank may be increased as desired. In the form shown in Fig. 1 each of these cells comprises a rectangular framework 6, conveniently of wood, the bottom member 7 being provided with longitudinal recesses 8. Filter bags 9, of canvas or other material are drawn over the frames 6 and their lower open ends secured by cleats 10 engaging the recesses 8 above mentioned. Each filter-cell has a bottom discharge 11, the several cells being shown as connected to a common main 12 extending through the tank wall and terminating in a cock 13.

In order to keep the walls of the cells distended under the weight of the material in the tank I prefer to provide in each cell a non-metallic pervious material capable of preventing the collapse or serious displacement of the filtering walls, while at the same time affording a free passage for the filtered solution. Metallic fillings, as iron wire, etc., are objectionable, as exhibiting a tendency to react with or dissolve in the solutions used under certain conditions, and also by reason of their tendency to corrode and to cause the decay of the filtering cloths or otherwise to weaken them; furthermore such fillings decrease the filtering capacity of the cloths by obstructing their interstices. One filling material which I have found suitable for this purpose is cocoa matting, which may be flexed as shown at 14 in Fig. 1 to form a filling, or it may be otherwise disposed.

As a modified means for supporting the filter walls I have shown in Fig. 2 a spacing strip 15, conveniently of wood, of which any required number may be used, the several strips being cut away at the sides as shown to provide the maximum practicable filtering area. Or the cells may be filled or packed with strips, blocks or pieces of wood or other material which may be of irregular shape and of ununiform size, the essential feature being the provision of a filling which shall be capable of supporting the walls or preventing substantial displacement thereof while providing a free passageway for the filtered liquid. The tank 1 is also provided with one or more cocks 16 disposed at various levels and serving to draw off clear but unfiltered solution as hereinafter described; and an outflow pipe 17 near the top. A sludge gate 18 permits the quick discharge of the contents of the tank.

The mode of operation of the apparatus will depend upon the character of the material treated, and more particularly upon the comparative readiness with which the material may be filtered or settled. For instance a pulp carrying a certain quantity of liquid may be run into the tank, and the valve 13 opened, permitting the outflow of the clear solution which has passed through the filters 9. When the pulp is of such nature that it settles leaving a substantially clear liquor, one or more of the decanting cocks 16 is opened and such clear solution withdrawn. After the greater portion of the solution has been separated by filtration or decantation or both, wash water or barren solution is forced through the opening 13 and in reverse direction through the filters, and is subsequently recovered as above. After the recovery of the values is substantially complete the residual pulp is sluiced out through 18.

While I have described the filters as operating by gravity, it will be understood that suction may be applied to the outlet 13 should this be desirable.

While the apparatus is especially designed for the treatment of ore-pulp, it is useful for the filtration and decantation of various liquids from pulp or solids.

I claim:

1. A filter cell comprising an open frame, a filtering medium thereon, an outlet, and a non-metallic pervious filling adapted to support said filtering medium while providing a free passage for filtered liquid, substantially as described.

2. A filter cell comprising an open frame, a filtering medium thereon, an outlet, and a non-metallic pervious filling of woven or plaited fabric adapted to support said filtering medium while providing a free passage for filtered liquid, substantially as described.

3. A filter cell comprising an open frame, a filtering medium thereon, an outlet, and a pervious filling of cocoa matting adapted to support said filtering medium while providing a free passage for filtered liquid, substantially as described.

4. In combination, a tank and a filter cell therein, said filter cell comprising an open frame, a filtering medium thereon, an outlet, and a non-metallic pervious filling adapted to support said filtering medium while providing a free passage for filtered liquid, substantially as described.

5. In combination, a tank and a filter cell therein, said filter cell comprising an open frame, a filtering medium thereon, an outlet, and a non-metallic pervious filling of woven or plaited fabric adapted to support said filtering medium while providing a free passage for filtered liquid, substantially as described.

6. In combination, a tank and a filter cell therein, said filter cell comprising an open frame, a filtering medium thereon, an outlet, and a pervious filling of cocoa matting adapted to support said filtering medium while providing a free passage for filtered liquid, substantially as described.

Signed at the city and county of Denver, State of Colorado this 31st day of July 1906.

WILBUR ALSON HENDRYX.

Witnesses:
CHAS. R. DAVIES,
THEODORA WELLS.